May 9, 1939. H. L. BERNARDE 2,157,845
METHOD OF MAKING MEASURING INSTRUMENT POINTERS
Filed Oct. 9, 1936

WITNESSES:
Michael Stark
Wm. C. Groome

INVENTOR
Henry L. Bernarde.
BY
ATTORNEY

Patented May 9, 1939

2,157,845

UNITED STATES PATENT OFFICE 2,157,845

METHOD OF MAKING MEASURING INSTRUMENT POINTERS

Henry L. Bernarde, Kearny, N. J., assignor to Westinghouse Electric & Manufacturing Company, East Pittsburgh, Pa., a corporation of Pennsylvania Application October 9, 1936, Serial No. 104,828

2 Claims. (Cl. 29—148)

The invention relates to electrical measuring instruments, and particularly, to an improved construction for the indicating pointer of small instruments, such as ammeters, volt meters and the like.

Difficulty has usually been experienced in manufacturing the indicating pointers for small measuring instruments because of the difficulty in making the pointer sufficiently light for accuracy, and at the same time, heavy enough for practical operation. In view of the small values of energy involved, a pointer of the required mechanical strength is usually too heavy, giving an inaccurate reading on small energy values and, because of its inertia, causing over-shooting when the available energy is sufficient.

When the pointer is made sufficiently light for accurate operation, particularly in the case of alternating-current instruments, pointer vibration occurs at some critical frequency, which of course, is undesirable.

The ideal pointer would be one in which the thickness tapered decreasingly from the base, where it is connected to the instrument movement, toward the pointer end or target which cooperates with the usual scale. This would give the desired strength at the base where it is needed, and the overall weight would not be sufficient to cause inertia troubles or inaccuracy.

In practice, however, it has been difficult, if not impossible, from a practical point of view, to make a tapered pointer in quantity production at a reasonable cost. It is possible, of course, to roll each pointer separately to the desired taper, or to roll a sheet longitudinally to taper in thickness from one edge to the other and blank the pointers laterally of the sheet. Both of these expedients introduce manufacturing difficulties and excessive cost and even greater difficulties are encountered in producing a tubular pointer having the desired taper.

It is an object of the present invention, therefore, to provide a method of forming or manufacturing an indicating instrument pointer which is cheap and effective, and at the same time, results in a pointer of desired mechanical characteristics.

Figure 1:
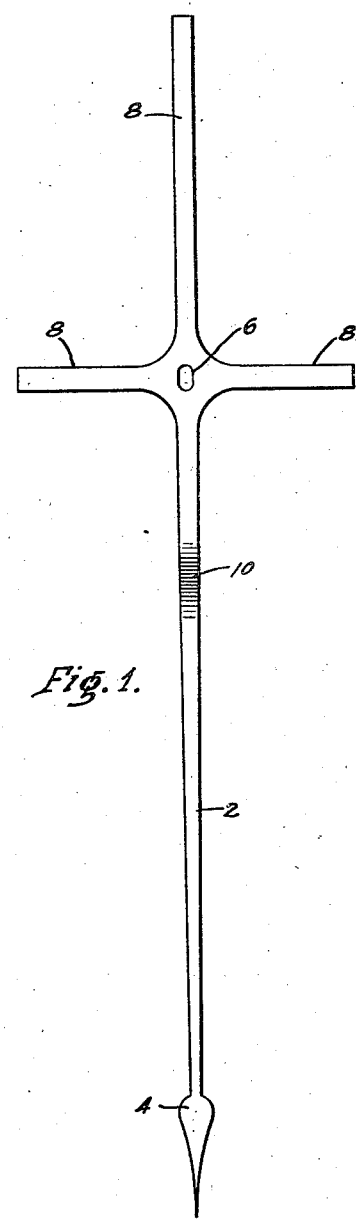
Figure 2:
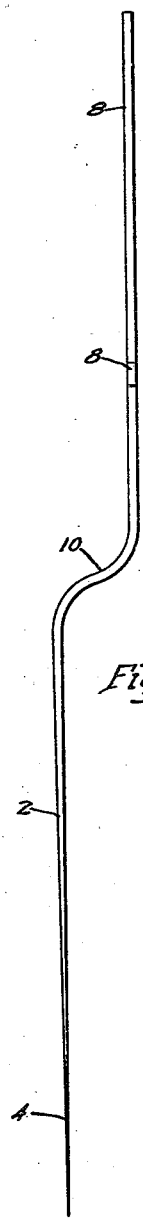

Other objects of the invention will be apparent from the following description when read in connection with the accompanying drawing, in which:

Figure 1 is a plan view of a pointer constructed in accordance with the invention; and Fig. 2 is a side elevation of the pointer shown in Fig. 1.

By way of example, the pointer illustrated comprises a body portion 2, terminating at one end in an indicator or target 4, and at the other end in a cross-piece having an aperture 6 for securing the entire structure to a pivotally mounted portion of the instrument movement. The cross arms 8 are for the purpose of receiving weights of any desired type to properly balance the entire structure about the aperture 6. If desired, and as indicated in Fig. 2, the pointer may be bent at an intermediate portion 10, so that the target 4 may readily pass over a dial plate which is usually at a plane higher than the portion of the instrument movement engaging the aperture 6.

It is understood, of course, that the form of the pointer may be varied within wide limits, the illustration being merely of one type to the manufacture of which the invention is applicable.

It is customary in the manufacture of instrument pointers on a large scale, to cut or blank the pointers from a sheet of desired material, and it is preferred that this expedient be used in the present invention although quite obviously other expedients may be used.

In the preferred manner of practicing the invention, a sheet of light-weight material, such as aluminum, having a width substantially the same or slightly in excess of the length of the pointer desired, is diped edgewise into a bath of corrosive material, or a material which reacts chemically with the metal of the pointer, such as caustic soda in the case of aluminum, and submerged in the bath the desired extent, substantially the length of the pointer from the tip of target 4 to the cross-piece. The sheet is then raised at such a rate of speed to obtain a desired reduction in the thickness of the sheet at the edge dipped into the bath. Obviously, as the sheet is dipped and raised, the edge inserted into the bath will be subjected longest to the action of the corrosive material, and such subjection will vary in time from the maximum at such edge to a minimum at the portion of the sheet adjacent the surface of the bath when the sheet is emerged.

Of course, the desired result may be obtained by a single dipping and withdrawal, or by successive dippings until the desired thickness or taper is obtained.

The sheet may then be cleaned in any desired maner and the pointers blanked from it with the target end adjacent the thinnest edge of the sheet. The pointers may then be bent as indicated in Fig. 2, and suitably painted or otherwise treated to make them ready for mounting on the instrument movement.

In the case of tubular pointers, aluminum tubing, or other desired metal tubing, is cut in lengths corresponding to the length of the pointer, and the pieces dipped axially into the bath and withdrawn. As in the case of the sheet material, the tube walls will be tapered in thickness a desired amount depending upon the duration of the dipping operation or the number of dips to which the tube is subjected.

Although aluminum is a preferred material for pointers of this general character because of its light weight, quite obviously other materials are available and may be substituted therefor. The method described is applicable, however, except that a different corrosive or etching bath may be required, depending upon the material of the pointer.

I claim as my invention:

1. The method of manufacuring a pointer having a tapered thickness from the point to the base thereof, which comprises dipping a piece of sheet material into a corrosive bath to a depth corresponding to the desired length of the tapered portion and withdrawing it at such speed that a progressively increasing amount of material is removed from the sheet to form the desired tapered thicknes, and cutting a pointer of desired shape from said sheet material.

2. The method of forming a pointer of tapered thickness from the point to the base thereof which comprises dipping a metal sheet of constant thickness edgewise into a bath of etching fluid and withdrawing it gradually to progressively remove the metal from the sheet to taper its thickness from one edge to the other, and cutting from said sheet pointers of an increasing tapered thickness from the point to the base thereof.

HENRY L. BERNARDE.